3,310,612
ENCAPSULATING METHOD AND APPARATUS
George R. Somerville, Jr., San Antonio, Tex., assignor to Southwest Research Institute, San Antonio, Tex.
Filed Mar. 29, 1965, Ser. No. 443,192
10 Claims. (Cl. 264—4)

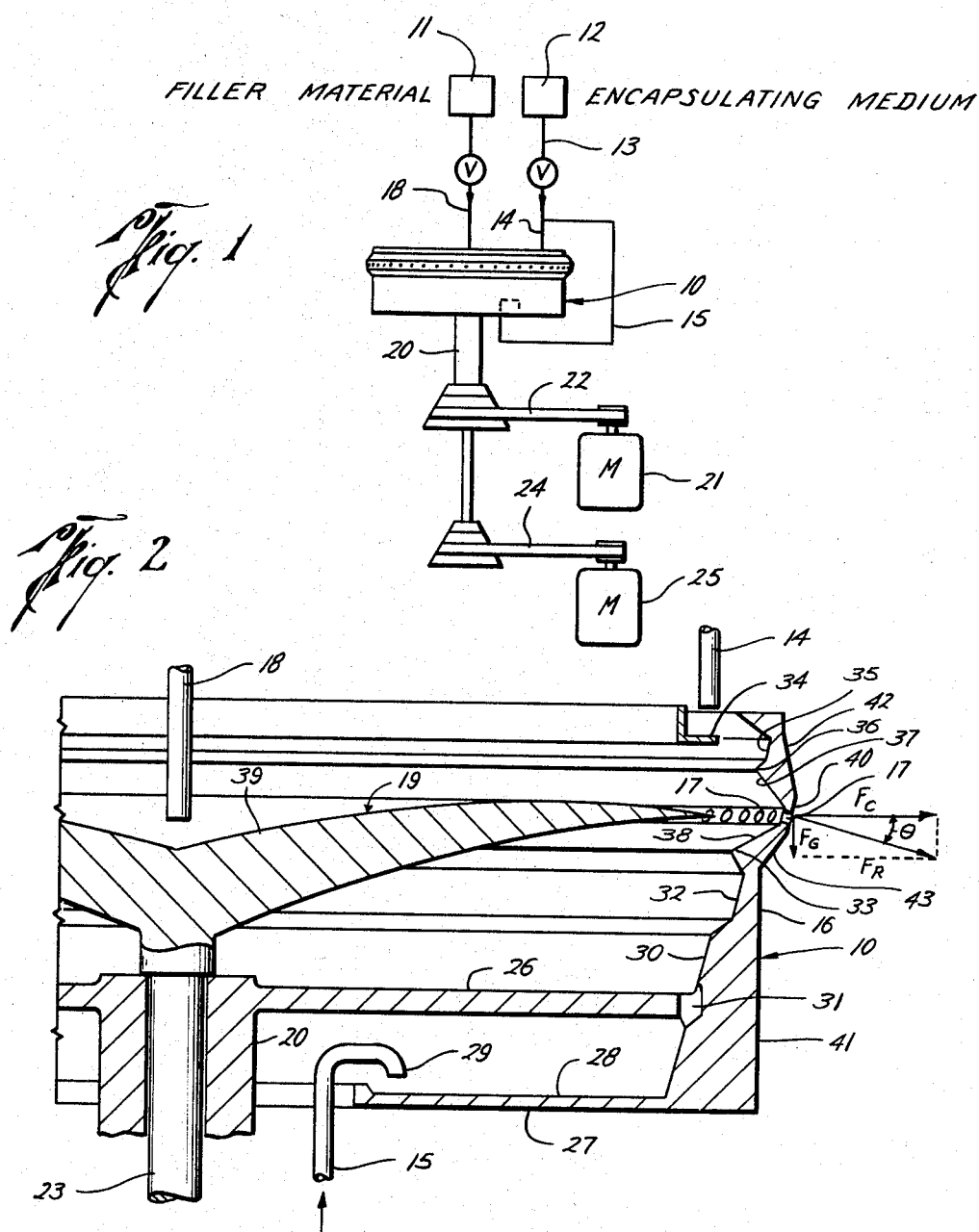

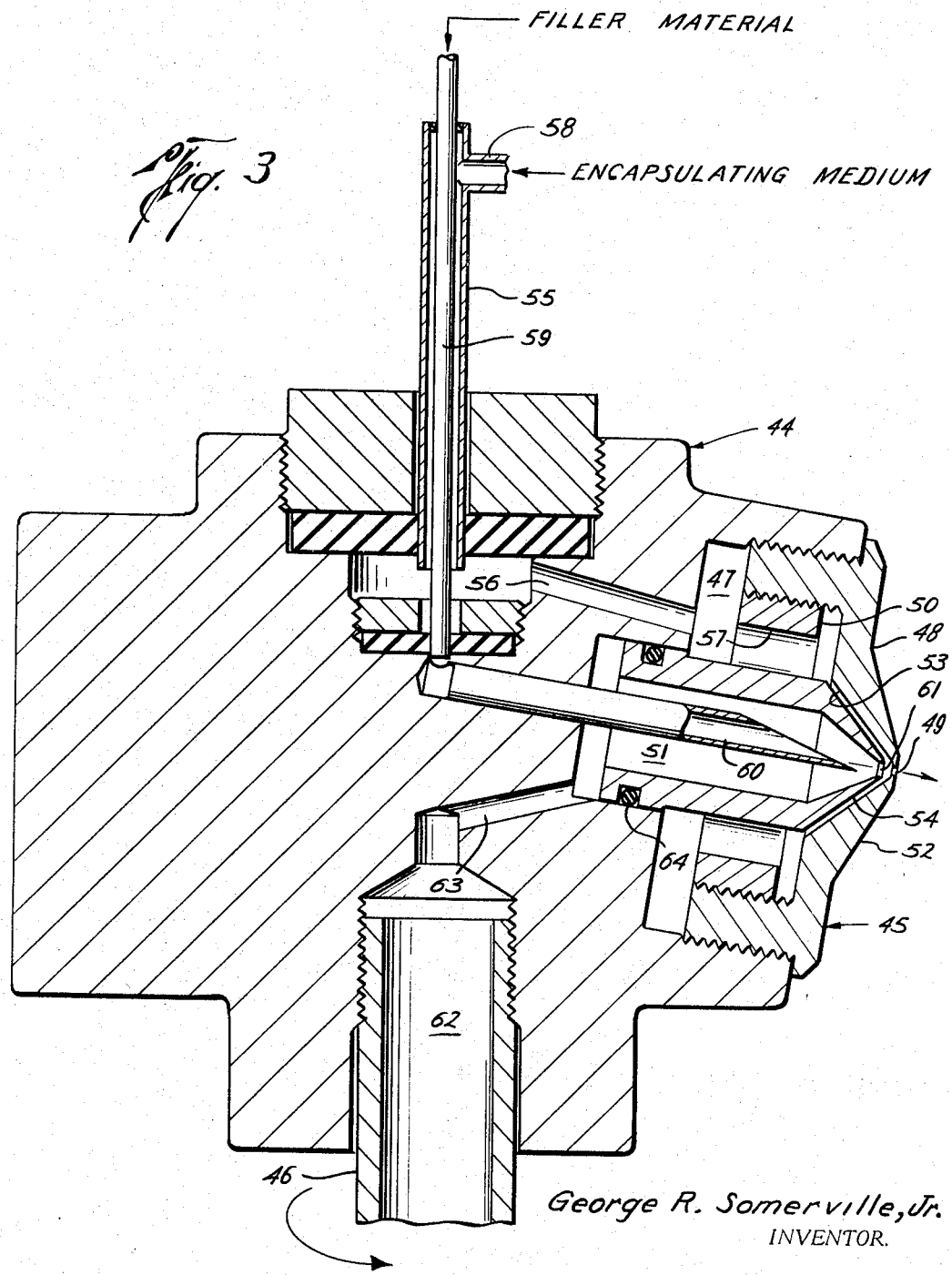

This invention relates to an improved method and apparatus for centrifugally encapsulating a filler material in an encapsulating medium.

As described in my prior Patent No. 3,015,128, an apparatus of this general type is particularly useful in the mass production of such capsules. In each of the embodiments illustrated in the patent, the apparatus comprises a hollow cylindrical body rotatable about a vertical axis and having a concentrically arranged band of orifices extending through its outer wall. During rotation of the body, the liquid encapsulating medium is supplied thereto so as to form successive films of the medium across the inner end of each orifice, and filler material is delivered to the films across the orifices. The speed of rotation of the cylindrical body is such that the resulting centrifugal force overcomes the adhesive forces of the medium at the orifices, whereby it wraps about the filler material and is severed and flung outwardly from the orifices. As each capsule is so severed, another film forms across the orifice to receive the filler material. The liquid medium is then solidified by any suitable means, such as a hardening bath arranged about the body to receive the wet capsules.

As also described in my prior patent, in an alternative form of this general type of apparatus, the encapsulating medium is supplied to an orifice through a nozzle mounted on a body, which is also rotatable about a vertical axis so as to form successive films of the medium across the inner end of the orifice. In this form, the filler material is delivered to the films of encapsulating medium by means of a conduit extending within the nozzle to a point closely adjacent the inner end of the orifice. Here again, the nozzle is rotated at a speed sufficient to form the capsule and sever and fling it from the outer end of the orifice.

Assuming a given orifice diameter, the size of the capsule produced by such apparatus in either form is a function of the rotational speed of the encapsulating head. More particularly, the capsule size varies inversely with the speed of rotation of the head, so that, in order to produce large capsules, it is necessary to rotate the head at a relatively slow speed. Although one of the main advantages of this centrifugal encapsulating apparatus is its ability to mass produce relatively small capsules, there are many occasions in which it would be advantageous to use it in the production of these larger capsules. However, in a typical run using apparatus of this type, it has been found impossible to form capsules as large as 1,500 microns in diameter; and, even at lesser diameters of the order of 1,000 microns, the capsules produced by such apparatus have been of unsatisfactory quality.

It is therefore the object of this invention to provide a method and apparatus for centrifugally encapsulating larger capsules of a good quality, particularly with apparatus of generally the same construction as that above described.

In my work in connection with apparatus of this general type, I have noted that when the head is rotated at these slower speeds, there is a tendency for the wet capsules to run down the face of the outer wall of the head. Thus, although the force of gravity is a negligible factor and may be ignored in the production of small capsules, it is apparently significant in the production of larger capsules. In accordance with the present invention, I propose to compensate for this gravitational force by disposing the axis of each of the orifices downwardly and outwardly from the inner to the outer end thereof. More particularly, I propose to extend the orifice axis at an angle which corresponds substantially to the resultant of the vectors of the centrifugal and gravitational forces on the capsule as it leaves the orifice.

Preferably, the outer wall of the head is perpendicular to the axis of each orifice at the intersection of the outer end of such orifice therewith so that the lip surrounding the outer end of the orifice is symmetrical of its axis. The portion of the outer wall providing the entry to the inner end of the orifice is also symmetrical of its axis, and preferably comprises outwardly convergent surfaces intersection such inner end.

In the drawings, wherein like reference characters are used throughout to designate like parts, FIG. 1 is a partly diagrammatic illustration of the above described form of the invention in which the encapsulating head comprises a rotatable cylindrical body;

FIG. 2 is an enlarged cross sectional view of the cylindrical body; and

FIG. 3 is a cross sectional view of the other above-described form of the invention wherein the encapsulating head comprises a rotatable body on which a nozzle is mounted.

With reference now to the details of the above-described drawings, and particularly the embodiment shown in FIGS. 1 and 2, the filler material and encapsulating medium are supplied to the interior of the hollow cylindrical body 10 from sources 11 and 12, respectively. More particularly, the encapsulating medium flows downwardly from its source through a conduit 13 for delivery to the upper and lower ends of the body through branch conduits 14 and 15. The amount of such flow is controlled by a valve in the conduit 13. Upon rotation of the body, in a manner to be described, the medium supplied thereto is caused to flow outwardly to the outer wall 16 of the cylinder and then spread uniformly over the inner surface of this outer wall. This forms a film across the inner end of each of orifices 17 extending through the wall and arranged as a band concentrically about the rotative axis of the body.

The filler material, on the other hand, flows downwardly from its source 11 through a conduit 18 onto an impeller disc 19 mounted concentrically within the cylinder and rotatable coaxially therewith. Here also, the flow of filler material is controlled by a valve in the line 18. As will be described to follow, upon rotation of the disc, filler material in liquid form is flung outwardly against the film across the orifices 17, either in the form of discrete particles or as a thin sheet. Then, as previously described, the centrifugal force on the films causes them to surround the filler material and be severed and flung outwardly from the outer ends of the orifices 17.

As shown, the cylindrical body 10 is mounted upon shaft 20 which is rotated by means of a motor 21 connected thereto by a belt 22. The impeller disc 19 is arranged concentrically of the body and mounted on shaft 23 coaxial with and extending through a central opening in shaft 20 for connection by means of a belt 24 to motor 25. This permits the impeller disc and cylindrical body to be rotated at different speeds for reasons explained in my prior patent.

Referring to the details of FIG. 2, the shaft 20 is connected to the outer wall 16 of the body 10 by means of a web 26. There is a flange 27 extending radially inwardly from the lower wall 16 to provide a horizontal surface 28 onto which encapsulating medium may be fed through the bent end 29 of conduit 15. As the cylinder rotates, the encapsulating medium will be caused by the centrifugal force to flow outwardly to the inner surface 30 of the wall 16. As can be seen from FIG. 2, this surface is sloped upwardly and outwardly so that the encapsulating medium is free to spread upwardly therealong and through ports 31 formed in the web 26. There is an annular depression 32 in the inner surface 30 which is separated from the band of orifices 17 by a dam or weir 33, which maintains the encapsulating medium at a relatively uniform level as it spills over onto the orifices.

Similarly, encapsulating medium which is fed through the conduit 14 drops upon a flange 34 disposed beneath the lower end of the conduit for deflecting it radially outwardly into the annular depression 35 on the inner surface 30 of the wall 16. This depression is separated from the band of orifices by a dam or weir 36 which, similarly to the dam 33, maintains the flow of encapsulating medium at a uniform level. In spilling over the dams 33 and 36, the encapsulating medium flows into an entry portion of the inner surface 30 leading to the orifices 17 which is formed by outwardly converging walls 37 and 38.

As also shown in FIG. 2, the upper surface 39 of the impeller disc 19 is formed with a central depression onto which the filler material is fed through the conduit 18. From this depression, the filler material is delivered by the rotation of the impeller radially outwardly along the upper surface 39 of the disc. From the outer edge of the surface 39, discreet particles or a thin sheet of the filler material is flung against the film of medium across the band of orifices 17. As also described in my prior patent, when capsules are caused by the centrifugal force due to rotation of the body 10 to form on the outer ends of the orifices 17 and then to be severed and flung outwardly therefrom, they are caught in a hardening bath or the like to solidify the wet encapsulating medium.

Reference may obviously be had to my prior patent for a consideration of the variables involved in the production of capsules by means of apparatus of this general type. However, in the improved construction of this apparatus, the axis of each orifice 17 extends downwardly and outwardly from its inner to its outer end. More particularly, as shown diagrammatically in FIG. 2, each such axis extends at an angle $\theta$ defined between a line perpendicular to the axis of rotation of the cylinder and a line corresponding to the resultant $F_r$ due to the centrifugal force $F_c$ and gravitational force $F_g$ upon the capsule.

Although it is not extremely critical that the axis of the orifice extend along the angle $\theta$, definitely better results are obtained when the axis does extend at substantially this angle. With further reference to the diagrammatic illustration of the resultant force vectors of FIG. 2, the centrifugal force vector $F_c$ is equal to the square of the peripheral velocity of the orifice divided by the radius of rotation of the orifice multiplied by the force of gravity. Thus, in a typical calculation wherein the radius of rotation of the orifices is 4 inches and the body is rotated at 180 r.p.m., the centrifugal force vector $F_c$ will be 3.68 times the force of gravity $F_g$. Thus:

$$\text{Tan } \theta = 1/3.68 = 0.271$$

so that $$\theta = 15°10'$$

With the cylindrical body having its orifices arranged in accordance with this invention, it has been possible to produce good quality capsules in larger diameters than it has been possible to produce with the apparatus shown in my prior patent. For example, after unsuccessful attempts to produce capsules of about 2,200 microns in diameter through orifices of ⅛ inch in diameter formed in the prior apparatus, it was possible to produce satisfactory capsules of this same size and at a rate of about 2.5 per orifice per second with apparatus constructed in accordance with the present invention and having the following specifications:

| | |
|---|---|
| Radius of rotation of orifices _____inches__ | 4 |
| Number of orifices _____ | 90 |
| Speed of rotation of the cylinder _____r.p.m__ | 200 |
| Angle $\theta$ of the orifice axis, degrees _____ | 10.5 |
| Diameter of impeller disc _____inches__ | 3.5 |
| Speed of rotation of the impeller disc ____r.p.m__ | 600 |

In the capsules so formed with the apparatus constructed as above described, the filler material was odorless mineral spirits and the encapsulating medium comprised the following ingredients:

| | Percent |
|---|---|
| Sodium alginate (Marine Colloid's XRB–300) ___ | 1.6 |
| Poly(vinyl alcohol) (Du Pont's Elvanol 70–05) ___ | 3.5 |
| Hard capsule gelatine (Atlantic Gelatin) _____ | 0.5 |
| Glycerol _____ | 5.0 |
| Water _____ | 89.4 |

This particular example illustrates the flexibility with which the angle of the orifices may be arranged. Thus, although at the speed set forth, the resultant of the centrifugal and gravitational forces would extend at an angle $\theta$ of about 12°, satisfactory results were obtained with an angle $\theta$ of 10.5°. This, of course, renders the entire apparatus more flexible in that it enables the body to be rotated at somewhat different speeds in the production of other capsules.

In the preferred embodiment of the encapsulating cylinder shown in FIG. 2, the conical surfaces 37 and 38 are symmetrical with respect to the orifices 17—i.e., each such surface forms an equal acute angle with the axis of the orifice. Also, the lip surrounding the outer end of each orifice 17 is symmetrical of the axis of the orifice by virtue of the fact that the portion 40 of the outer surface 41 of the outer wall 16 surrounding such outer end is perpendicular to the orifice axis. As can be seen from FIG. 2, outer surface portion 40 is formed on outwardly converging portions 42 and 43 of the outer wall, so that there is a minimum tendency for the capsule to flow down over the outer wall as it emerges from the orifice.

In the embodiment of the invention shown in FIG. 3, the body 44 is mounted on a shaft 46 for rotation about a vertical axis and has a nozzle 45 on one side thereof. The nozzle includes an insert 48, encloses a chamber 47 in the body and has an orifice 49 extending therethrough. Rotation may be imparted to the shaft 46 in any suitable manner.

A plug 50 is threadedly connected to the interior of the insert 48 so as to form an inner chamber 51 within the chamber 47. The insert has an inner surface 53 which is outwardly conical and provides a symmetrical entry to the inner end of orifice 49. The outer end of the plug 50 has a similarly conically shaped wall 54 closely adjacent the surface 53 to provide an annular clearance therebetween. The plug may be adjusted axially of the insert and orifice 49 so as to control the size of this clearance.

The liquid encapsulating medium is fed through an outer conduit 55 and a passage 56 in the body into the chamber 47. From this chamber, such medium flows through ports 57 in the plug 50 into the annular clearance between the plug and insert 48. Upon rotation of the body, the encapsulating medium flows radially outwardly through the clearance to form a film thereof across the inner end of orifice 49. The encapsulating medium is fed to the outer conduit 55 at a controlled rate by means of a side conduit 58 connecting with a suitable source (not shown).

The filler material is fed from a suitable source (not shown) through an inner conduit 59 extending down through the outer conduit 55 and connecting at its lower end with an outwardly extending conduit 60. The latter conduit in turn extends to closely adjacent the outer end of the plug 50, which has an opening 61 therethrough axially aligned with the orifice 49. Preferably, and as, shown in FIG. 3, the conduit 60 is also axially aligned with the opening 61 in conduit 49. As the filler material flows downwardly through the conduit 59 and into the conduit 60, it is caused to be formed into discrete particles by the centrifugal force thereon. As shown, the end of the conduit is biased to aid in breaking off the particles.

If desired, air under pressure may be applied through opening 62 in shaft 46 and passage 63 to the inner surface of the film to aid in formation of a uniform capsule. This air is confined for flow through the plug 50 and the opening 61 in the end of the plug by means of an O-ring 64 surrounding the plug and sealably engaging with a counter bore on the inner end of chamber 47 of the body 45.

In this latter embodiment of the invention, as in the embodiment shown and described in connection with FIGS. 1 and 2, the axis of the orifice 49, as well as the aligned axes of opening 61 and conduit 60, extend downwardly and outwardly from their inner to their outer ends. More particularly, these axes extend at angles corresponding substantially to the resultant force vector defined by the centrifugal force vector and gravitational force vectors on the capsules formed in the orifice 49.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In apparatus for centrifugally encapsulating a filler material in an encapsulating medium, including a head rotatable about a vertical axis and having at least one orifice extending through the outer wall thereof, means for supplying an encapsulating medium to the head for forming successive films thereof across the inner end of the orifice during rotation of the head, means for delivering a filler material to the inner surface of the films, and means for rotating the head at such speed as to cause the filler material to be encapsulated in said film and the capsule to be severed and slung from the outer end of the orifice; the improvement comprising the disposal of the axis of said orifice at an angle extending downwardly and outwardly from the inner to the outer end thereof.

2. Apparatus for centrifugally encapsulating a filler material in an encapsulating medium, comprising a hollow cylindrical body having a vertical axis about which it is rotatable and a band of orifices arranged concentrically about the axis with each orifice extending through the outer wall of the body downwardly and outwardly from its inner to its outer end, means for supplying the encapsulating medium to the body so as to form successive films thereof across the inner ends of the orifices during rotation of the body, means for delivering a filler material to the inner surfaces of the films, and means for rotating said body at such speed as to cause the filler material to be encapsulated in said film and the capsule to be severed and slung from the outer end of the orifice.

3. Apparatus for centrifugally encapsulating a filler material in an encapsulating medium, comprising a body rotatable about a vertical axis and having a nozzle with an orifice extending through the outer wall thereof downwardly and outwardly from the inner to the outer end of said orifice, means for supplying the encapsulating medium to the body so as to form successive films thereof across the inner end of the orifice during rotation of the body, means for delivering a filler material to the inner surfaces of the films, and means for rotating said body at such speed as to cause the filler material to be encapsulated in said film and the capsule to be severed and slung from the outer end of the orifice.

4. Apparatus of the character defined in claim 2, wherein the portions of the outer wall of the hollow body providing an entry to the inner end of each of the orifices are outwardly convergent symmetrically of the axis of said orifice.

5. Apparatus of the character defined in claim 2, wherein the portion of the outer wall of the hollow body surrounding the outer end of each orifice is perpendicular to the axis of the orifice to form a lip symmetrically of said outer end of the orifice.

6. Apparatus of the character defined in claim 5, wherein the portions of the outer wall of the hollow body providing an entry to the inner end of each of the orifices are outwardly convergent symmetrically of the axis of said orifice.

7. Apparatus of the character defined in claim 3, wherein the portion of the outer wall of the nozzle providing an entry to the inner end of the orifice is outwardly convergent symmetrically of the axis of said orifice.

8. Apparatus of the character defined in claim 3, wherein the portion of the outer wall of the nozzle surrounding the outer end of the orifice is perpendicular to the axis of said orifice to form a lip symmetrically of said outer end of said orifice.

9. Apparatus of the character defined in claim 8, wherein the portion of the outer wall of the nozzle providing an entry to the inner end of the orifice is outwardly convergent symmetrically of the axis of said orifice.

10. In a method of centrifugally encapsulating a filler material in an encapsulating medium, the steps of supplying the encapsulating medium to a head which is rotatable about a vertical axis and has at least one orifice extending through its outer wall downwardly and outwardly from the inner to the outer end thereof, so as to form successive films of the medium across the inner ends of the orifice during such rotation, delivering the filler material to the inner surface of the film, and rotating the head at a speed to cause the resultant of the vectors due to the centrifugal and gravitational forces on the capsule to extend in substantial alignment with the axis of the orifice.

References Cited by the Examiner

UNITED STATES PATENTS

| 2,525,970 | 10/1950 | Spier et al. | 18—2.6 X |
| 2,571,069 | 10/1951 | Sherman | 18—2.6 X |
| 3,015,128 | 2/1962 | Somerville | 18—2.6 |
| 3,055,049 | 9/1962 | Bruyne et al. | 18—2.6 |

WILLIAM J. STEPHENSON, *Primary Examiner.*